United States Patent [19]

Gannon

[11] Patent Number: 4,664,473
[45] Date of Patent: May 12, 1987

[54] OPTICAL FIBER FORMED OF $MGO$—$AL_2O_3$—$SIO_2$ GLASS

[75] Inventor: John R. Gannon, Chetstow, United Kingdom

[73] Assignee: Corning Glass Works, Corning, N.Y.

[21] Appl. No.: 718,697

[22] Filed: Apr. 1, 1985

[51] Int. Cl.[4] .................................................. G02B 6/16
[52] U.S. Cl. .............................. 350/96.33; 350/96.34; 501/37; 501/69; 501/900
[58] Field of Search .............. 350/96.29, 96.30, 96.31, 350/96.33, 96.34; 501/37, 69, 900

[56] References Cited

U.S. PATENT DOCUMENTS

| 3,402,055 | 9/1968 | Harris et al. | 501/69 X |
| 4,478,489 | 10/1984 | Blankenship et al. | 350/96.30 |
| 4,480,897 | 11/1984 | Okamoto et al. | 350/96.30 |
| 4,515,436 | 5/1985 | Howard et al. | 350/96.33 |

OTHER PUBLICATIONS

Marrone et al, "Polarization Properties of Birefringent Fibers with Stress Rods in the Cladding", *J. of Lightwave Tech.*, vol. LT-2, No. 2, Apr. 1984, pp. 155-160.

*Primary Examiner*—John Lee
*Attorney, Agent, or Firm*—K. van der Sterre

[57] ABSTRACT

Optical fibers comprising core and/or cladding elements composed of $MgO$—$Al_2O_3$—$SiO_2$ glasses are described wherein control of thermal expansion mismatch among the core and cladding elements is possible. Low-stress, high numerical aperture fibers as well as prestressed polarization-relating and high strength fibers are described.

10 Claims, 4 Drawing Figures

OPTICAL FIBER FORMED OF MGO—AL₂O₃—SIO₂ GLASS

BACKGROUND OF THE INVENTION

1. Field of Invention

The present invention relates to the field of optical fibers and particularly to new compositions for glass optical waveguide fibers which can provide fibers with controlled internal stress characteristics.

2. Description of the Prior Art

At present most if not all of the low loss (less than 20 db/km) optical waveguide fiber being installed for telecommunications applications is glass core-glass clad fiber made of fused silica and doped silica materials. U.S. Pat. No. 3,659,915 describes glass optical fibers made of such materials, and identifies a number of dopant materials, including $TiO_2$ and $Al_2O_3$, which can be added to fused silica to raise its index of refraction.

The bulk of the optical fiber sold for commercial use contains $GeO_2$ as a dopant for increasing the refractive index. $GeO_2$ is effective in raising the refractive index of silica, does not introduce significant optical absorption at wavelengths where the fibers are to be used, and is easily derived from the commercially available volatile chloride $GeCl_4$.

The need for glass stress control in optical fiber design and manufacture is always of some concern but is particularly important in the manufacture of optical fibers of high numerical aperture (NA). The numerical aperture, which for an optical fiber is a number representative of its light-gathering power, depends on the difference between the refractive index of the core of the fiber ($n_1$) and the refractive index of the cladding ($n_2$), as follows.

$$NA = \sqrt{(n_1)^2 - (n_2)^2}$$

In general, the refractive index of fused silica is raised only to an extent proportional to the amount of index-increasing dopant added to the silica; thus large amounts of core dopant relative to cladding doping levels are required to obtain the high index core needed for high numerical aperture fibers. The amount of dopant which can be added to the core of an optical fiber is limited, however, since all dopants currently used for optical fiber fabrication can undesirably change properties other than refractive index, such as viscosity and thermal expansion, as they are added to the glass.

Thermal expansion changes can be undesirable since they cause an expansion mismatch between the cladding and the core which can introduce large stresses into the optical fiber or into the glass preform from which the optical fiber is made. Thus it is difficult to produce a high numerical aperture fiber using, for example, $GeO_2$ as a core dopant because of the large amount of $GeO_2$ which must be added to the core glass. To achieve a numerical aperture greater than about 0.3, more than 20 mole percent of $GeO_2$ must be introduced into the core. This results in a core glass with an average linear coefficient of thermal expansion which is more than $23 \times 10^{-7}/°C$. greater than the expansion of the pure fused silica cladding glass. Depending upon the manufacturing process used, such stresses can cause considerable difficulty, particularly with respect to stress cracking of the glass preform.

The problem of preform stress has been recognized and a number of approaches to minimize the problem have been proposed. U.S. Pat. No. 4,194,807 proposes the use of a silica-free core glass composition based on $GeO_2$ in combination with a silicate glass cladding material of relatively high expansion coefficient. U.S. Pat. No. 4,038,090 discloses multicomponent silicate glass compositions from which fiber optics with low internal stress can be made by ion-exchange processing.

U.S. Pat. No. 4,177,319 describes alkali-MgO-SiO₂ glass compositions, optionally containing $Al_2O_3$, which can produce fiber optics with numerical apertures up to or slightly exceeding 0.3 by ion-exchange processes. However, multicomponent glasses such as described in that patent are typically produced by melting and do not exhibit the low optical attenuation characteristics of the doped silica glasses produced by vapor phase deposition. The same is true of multicomponent glasses such as described in U.S. Pat. No. 4,264,131, which are proposed as optical fiber glasses of high chemical durability. British Pat. No. 1,160,535 discloses optical fiber compositions containing $Al_2O_3$, $SiO_2$ and at least two alkaline earth metal oxides from the group MgO, CaO and BaO; again these glasses are produced by melting and at least four components are needed.

For vapor phase glass manufacture it is particularly desirable from the standpoint of equipment design and composition control that the number of glass forming components by minimized. Hence ternary or simpler compositions are to be preferred over quaternary or more complex glasses. Also, present optical fiber designs require a high degree of control over composition profile. This makes readily diffusible glass components such as the alkali metals unattractive, and glasses essentially free of alkali metal oxides are used to fabricate commercial low-loss optical fibers.

In addition to fibers of high numerical aperture, another area where fiber stress characteristics are of concern is in the design of polarization-retaining simple-mode optical waveguides. U.S. Pat. No. 4,395,270 discloses examples of such waveguides wherein polarization retention is effected by a stress-induced birefringence within the fiber.

The structure of polarization-retaining fibers such as described in this patent typically includes a pair of diametrically opposed longitudinal stress elements which are regions of glass running parallel with and on opposite sides of the fiber core. These glass stress elements have a thermal expansion coefficient differing from that of the fiber cladding in which they are disposed, with the degree of difference determining the amount of stress present.

A particularly desirable design for such a fiber would be one in which the stress elements differ in thermal expansion but not in refractive index from the adjacent cladding glass. Maintaining a close or identical refractive index relationship between a stress element and any adjacent cladding material would minimize the propagation of unwanted cladding modes by the optical fiber.

SUMMARY OF THE INVENTION

The present invention provides glass optical fibers of novel composition wherein the stress characteristics of the fiber can more readily be controlled. Utilizing these compositions, fibers of high numerical aperture and reduced internal stress, as well as fibers with independently controlled internal stress and refractive index profiles, can be made. Advantageously the glass compositions employed for fiber fabrication in accordance with the invention are simple ternary compositions which can be practically attained in pure form by vapor phase deposition processes, if desired.

Glasses utilized for optical fiber manufacture in accordance with the invention are silica-based glasses in the $MgO-Al_2O_3-SiO_2$ ternary composition system, having expansion coefficients in the range of about $6-50\times10^{-7}/°C$. and refractive indices between about 1.46–1.56. The compositions consist essentially, in mole percent, of about 3–20% MgO, 3–42% $Al_2O_3$, and 45–94% $SiO_2$.

The characteristic of these magnesium aluminosilicate compositions which renders them particularly useful for optical fiber fabrication is a relatively low degree of interdependence between refractive index and thermal expansion coefficient. While in binary, high-silica glasses refractive index increases are closely accompanied by increases in thermal expansion coefficient, glasses in the high silica region of the $MgO-Al_2O_3-SiO_2$ system may be prepared which are identical in thermal expansion yet widely different in refractive index or, conversely, of the same index but differing substantially in thermal expansion. This makes possible a great degree of control over the optical and stress characteristics of the optical fiber product.

The above-described magnesium aluminosilicate glasses may be used to form any one of the various core, cladding, or optional stress elements to be provided in the optical fiber, or any combination of those elements. Thus an optical fiber could have a silica (100% $SiO_2$) cladding and a $MgO-Al_2O_3-SiO_2$ core, or both the core and the cladding could be formed of $MgO-Al_2O_3-SiO_2$ glasses of different index, or the cladding could comprise a combination of an $MgO-Al_2O_3-SiO_2$ cladding element fused to $MgO-Al_2O_3-SiO_2$ stress elements of differing composition and thermal expansion, the core being either of a higher-index $MgO-Al_2O_3-SiO_2$ composition or a completely different and unrelated high index glass.

DESCRIPTION OF THE DRAWING

The invention may be further understood by reference to the drawing, wherein.

DETAILED DESCRIPTION

Figure 1:
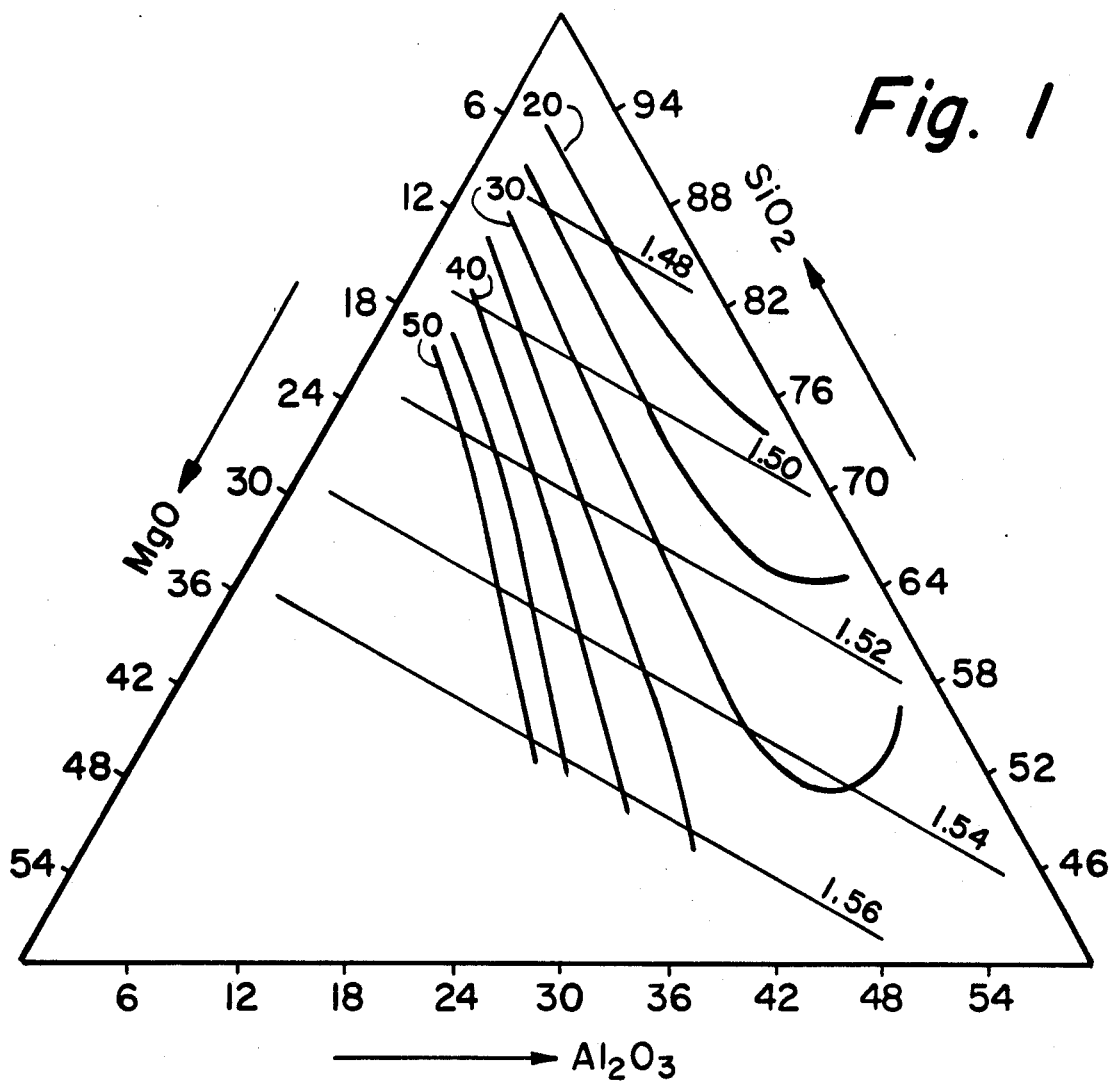
FIG. 1 is a ternary diagram of a portion of the $MgO-Al_2O_3-SiO_2$ system wherein lines of invariant refractive index and thermal expansion coefficient are shown.

As shown in FIG. 1 of the drawing, lines of invariant refractive index (isofracts) in the high-silica region of the $MgO-Al_2O_3-SiO_2$ system form a series of parallel lines nearly perpendicular to the $MgO-SiO_2$ join of the diagram. These isofracts, corresponding to refractive index values ($n_D$) between 1.48 and 1.56, indicate that, at a given $Al_2O_3$ level, refractive index is strongly dependent on the $MgO:SiO_2$ ratio in the region of the system.

Also shown in FIG. 1 are a series of lines marked with legend numbers from 20–50, which are lines of invariant thermal expansion coefficient in the ternary composition field. The legend numbers correspond to average linear thermal expansion coefficients. These lines indicate that, at a given $SiO_2$ level, refractive index is strongly dependent on the $MgO-Al_2O_3$ ratio in these glasses. The expansion values given, both here and throughout this specification, are in the units $cm/cm°C.\times10^7$, expressed as an average over the temperature range 0°–300° C., unless otherwise stated.

The combined effect of the refractive index and thermal expansion characteristics of glasses in the field of the ternary diagram of FIG. 1 is that glasses can be selected which either vary as to thermal expansion but are matched as to refractive index or, conversely, which are closely matched as to thermal expansion but vary as to refractive index. The latter case is of particular interest for the design of a high numerical aperture optical waveguide.

Prior art optical fibers of high numerical aperture might typically comprise a cladding consisting essentially of pure fused silica, having a refractive index of 1.459, and an average thermal expansion coefficient (0°–300° C.) of approximately $5.6\times10^{-7}/°C$. The core typically consists of a $GeO_2-SiO_2$ glass. For a numerical aperture of approximately 0.3 in fibers of this design, the core glass must have a refractive index of about 1.489 which requires that somewhat more than 20 mole percent of $GeO_2$ be added to the core glass. This results in a $GeO_2-SiO_2$ core glass having an average thermal expansion coefficient in excess of about $28\times10^{-7}/°C$. The resulting thermal expansion mismatch between the $GeO_2-SiO_2$ core glass and the silica cladding (approximately $23\times10^{-7}/°C$.) can cause considerable difficulties such as interfacial cracks in preforms produced utilizing such glasses.

Figure 2:
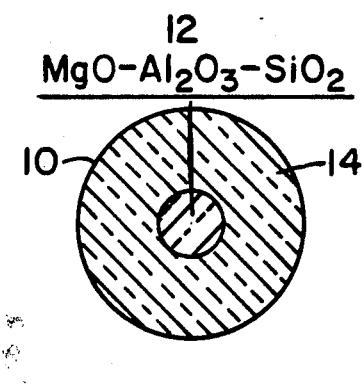
FIG. 2 is a schematic cross-sectional view of the end of a high numerical aperture optical waveguide fiber provided according to the invention.

An optical fiber produced according to the present invention could have a structure as schematically illustrated in FIG. 2 of the drawing, which is a cross-sectional view of the end of the fiber, wherein at least the core 12 of optical fiber 10 would be formed of $MgO-Al_2O_3-SiO_2$ glass. The cladding 14 of the fiber could also be formed of $MgO-Al_2O_3-SiO_2$ glass, or it could be formed of a $MgO-SiO_2$ glass or of pure fused silica.

Table I below sets forth some examples of possible configurations for such fibers which could be utilized to realize high numerical aperture with reduced core-cladding expansion mismatch and internal stress in an optical fiber design. Included in Table I for each of these optical fibers are a composition for each of the fiber core and cladding glasses, in mole percent of MgO, $Al_2O_3$, and/or $SiO_2$, the thermal coefficients of expansion (T.C.E.) of each of the core and cladding glasses, reported as average values over the temperature range 0°–300° C. ($\times10^7/°C$.), the refractive indices ($n_D$) of the core and cladding glasses, the numerical apertures of the fibers as calculated from the reported refractive index values, and the thermal expansion differential ($\Delta$T.C.E.) between the core and cladding glasses which governs the stress mismatch which would be encountered during optical fiber fabrication.

TABLE I

| | Optical Fibers | | | | | |
|---|---|---|---|---|---|---|
| | Fiber 1 | | Fiber 2 | | Fiber 3 | |
| | Core | Cladding | Core | Cladding | Core | Cladding |
| MgO | 5 | — | 11 | 3 | 12 | 9 |
| $Al_2O_3$ | 21 | — | 16 | — | 33 | 2 |
| $SiO_2$ | 74 | 100 | 73 | 97 | 55 | 89 |
| T.C.E. | 23 | 5.6 | 30 | 20 | 30 | 30 |
| $n_D$ | 1.49 | 1.46 | 1.51 | 1.47 | 1.54 | 1.48 |
| NA | 0.3 | | 0.35 | | 0.43 | |
| ΔT.C.E. | 17.4 | | 10 | | 0 | |

As evident from Table I, the use of a $MgO$—$Al_2O_3$—$SiO_2$ core glass in substitution for a $GeO_2$—$SiO_2$ core glass of the prior art silica clad optical fiber (Fiber 1 of Table I) makes realization of a 0.3 numerical aperture less difficult because the thermal mismatch stress between the core and cladding can be significantly reduced. Further reductions in stress may be realized, even at higher numerical apertures, using the proposed fiber design incorporating a $MgO$—$SiO_2$ cladding glass (Fiber 2). For designs of this type incorporating $MgO$—$SiO_2$ cladding glasses, glasses consisting essentially of 3–15 mole percent MgO and the remainder $SiO_2$ may be used.

The particularly preferred fiber designs of the invention are those wherein both the core and the cladding of the high numerical aperture fiber are composed of $MgO$—$Al_2O_3$—$SiO_2$ glass. An example of such a fiber is illustrated as Fiber 3 in Table I. With this fiber design it is possible to achieve very high numerical aperture in a fiber configuration which is essentially free of thermal mismatch stress. Hence Fiber 3 has a numerical aperture of 0.43 and no significant difference between the thermal expansion coefficients of the core and cladding. It is particularly for the design of optical fibers having numerical apertures greater than 0.3 and core/cladding thermal expansion mismatch values not exceeding about $10 \times 10^{-7}/°C$. that $MgO$—$Al_2O_3$—$SiO_2$ core glasses in combination with claddings composed either of $MgO$—$SiO_2$ glasses or $MgO$—$Al_2O_3$—$SiO_2$ glasses are best suited.

A second important area of application for $MgO$—$Al_2O_3$—$SiO_2$ glasses for optical fibers is in fiber designs incorporating deliberately introduced cladding stress elements. These may be either optical fibers incorporating compressively stressed outer cladding layers for enhanced strength, or fibers comprising buried stress elements for polarization retention. In the latter fibers, a pair of glass stress elements are buried in the fiber cladding adjacent to but on opposite sides of the fiber core, the stress elements applying stress across the core which enables the core to retain the polarization of a polarized optical signal being transmitted through the fiber. The stress elements develop stress because they differ in thermal expansion from the surrounding core, preferably having a substantially higher expansion coefficient than the cladding and therefore being in tensile stress in the fiber in use.

In the prior art, strengthening or polarization stress elements have typically been formed of glasses which differ from the adjacent cladding glasses not only in thermal expansion but also in refractive index. However, differences in refractive index are desirably avoided since they can result in secondary light guidance by the stress elements in the fiber which can interfere with high bandwidth signal propagation.

Figure 3:
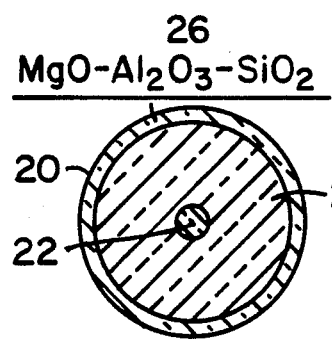
FIG. 3 is a schematic cross-sectional view of the end of a high-strength optical waveguide fiber provided according to the invention.
Figure 4:
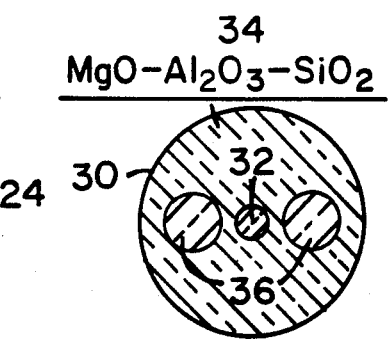
FIG. 4 is a schematic cross-sectional view of the end of a polarization retaining optical waveguide provided according to the invention.

Stressed fiber designs suitable for use in accordance with the invention are schematically illustrated in FIGS. 3 and 4 of the drawing, which show optical fiber ends in cross-section. FIG. 3 illustrates a design for a high strength optical fiber 20 comprising a glass core 22 with a high-expansion cladding 24 encased by a low-expansion outer cladding 26, the latter being in compressive stress due to thermal contraction by the former. In the construction of FIG. 3, the outer cladding 26 is made of a low expansion $MgO$—$Al_2O_3$—$SiO_2$ glass and the inner cladding 24 preferably of a higher expansion $MgO$—$SiO_2$ or $MgO$—$Al_2O_3$—$SiO_2$ glass; both glasses have the same index of refraction so that secondary light guidance by the inner cladding is avoided.

Table II below sets forth examples of possible fiber configurations which could be utilized to provide high strength optical fibers in accordance with the invention. Included in Table II for each of two hypothetical fiber designs are a glass composition for each of the cladding and outer cladding, in mole percent of MgO, $Al_2O_3$ and/or $SiO_2$, the thermal expansion coefficients (T.C.E.) of each of the glasses, reported as average values over the temperature range 0°–300° C. ($\times 10^7/°C.$), the refractive indices ($n_D$) of the cladding and outer cladding, and the difference in thermal expansion (ΔT.C.E.) between the two cladding elements.

TABLE II

| | Strengthened Optical Fiber | | | |
|---|---|---|---|---|
| | Fiber 4 | | Fiber 5 | |
| | Cladding | Outer Cladding | Cladding | Outer Cladding |
| MgO | 9 | 4 | 14 | 8 |
| $Al_2O_3$ | — | 10 | 4 | 16 |
| $SiO_2$ | 91 | 86 | 82 | 76 |
| T.C.E. | 32 | 20 | 40 | 25 |
| $n_D$ | 1.48 | 1.48 | 1.50 | 1.50 |
| ΔT.C.E. | 12 | | 15 | |

The cores of the optical fibers described in Table II above could be conventional doped silica glasses, $MgO$—$Al_2O_3$—$SiO_2$ core glasses, or any other glass of suitable refractive index. Hence Fiber 4 could have a core of $GeO_2$—$SiO_2$ glass containing 35% weight $GeO_2$ and the remainder silica, with a refractive index of about 1.49. Fiber 5 could have a core of $MgO$—$Al_2O_3$—$SiO_2$ glass consisting of about 14 mole percent MgO, 9 mole percent $Al_2O_3$ and 77 mole percent $SiO_2$, having an expansion coefficient of about $40 \times 10^{-7}/°C$. and a refractive index of about 1.51.

FIG. 4 of the drawing illustrates a polarization retaining optical fiber 30 with a glass core 32, wherein the bulk of the cladding may be formed of a relatively low expansion $MgO$—$Al_2O_3$—$SiO_2$ glass and the buried stress elements 36 of a relatively high expansion $MgO$—$SiO_2$ glass or $MgO$—$Al_2O_3$—$SiO_2$ glass of the same refractive index. The buried stress elements will be in a state of tensile stress in the fiber as drawn, and will therefore exert a stress across the core which will impart polarization retaining properties thereto.

Examples of fiber designs for polarization retaining fibers according to the invention are set forth in Table III below. Included in Table III for each of two hypothetical polarization-retaining optical fiber designs are glass compositions for each of the fiber cladding and buried stress elements, in mole percent of MgO, $Al_2O_3$ and/or $SiO_2$, the refractive indices ($n_D$) and thermal expansion coefficients (T.C.E.) of each of the cladding and stress elements, the latter reported as an average over the temperature range 0°-300° C., and the differences in thermal expansion between the cladding and buried stress elements.

TABLE III

|  | Fiber 6 | | Fiber 7 | |
| --- | --- | --- | --- | --- |
|  | Cladding | Stress Elements | Cladding | Stress Elements |
| MgO | 8 | 16 | 11 | 19 |
| $Al_2O_3$ | 16 | — | 23 | 7 |
| $SiO_2$ | 76 | 84 | 66 | 74 |
| $n_D$ | 1.50 | 1.50 | 1.52 | 1.52 |
| T.C.E. | 25 | 47 | 28 | 50 |
| ΔT.C.E. | 22 | | 22 | |

Core elements for optical fibers such as described in Table III above may consist of any glass of suitable refractive index and thermal expansion coefficient. Thus Fiber 6 could have a core of $GeO_2$—$SiO_2$ glass containing approximately 50% by weight of $GeO_2$ and the remainder silica, with an expansion coefficient of approximately $40 \times 10^{-7}/°C$. and a refractive index of about 1.51. Fiber 7 could have a core of MgO—$Al_2O_3$—$SiO_2$ glass containing 12 mole percent MgO, 26 mole percent $Al_2O_3$, and 62 mole percent $SiO_2$, with a refractive index of about 1.53 and a thermal expansion coefficient of about $30 \times 10^{-7}/°C$.

Methods for the manufacture of optical fibers containing stress-inducing optical elements are well known. For example, U.S. Pat. No. 4,395,270 to Blankenship et al. discloses a fabrication method wherein rods of core and cladding glass are placed with rods for the fiber stress elements in a support tube and the rod-and-tube assembly in drawn down into optical fiber. Thus Fiber 7 could be made by placing in a suitable support tube, such as a glass tube made of the MgO—$Al_2O_3$—SiO cladding composition disclosed for Fiber 7 in Table III above, a clad core rod comprising a core region of the MgO—$Al_2O_3$—$SiO_2$ core composition disclosed above and a cladding region having the same composition as the support tube. Placed in the support tube along with the core rod and on opposite sides thereof would be two rods composed of the high-expansion MgO—$Al_2O_3$—$SiO_2$ stress element composition shown for Fiber 7 in of Table III. Finally, the remainder of the space within the support tube would be filled with glass rods of the MgO—$Al_2O_3$—$SiO_2$ cladding composition. The resulting assembly could then be collapsed and drawn into optical fiber according to the procedure disclosed in U.S. Pat. No. 4,395,270 to provide a polarization-retaining optical fiber having a cross-sectional configuration substantially as shown in FIG. 4.

MgO—$Al_2O_3$—$SiO_2$ glasses to be utilized for optical fiber fabrication in accordance with the invention may be prepared by conventional melting techniques using purified batch materials, if necessary, but would more preferably be made by CVD methods wherein glasses of the desired composition are deposited as soots on a suitable substrate and consolidated to clear glass by sintering. An important advantage attending the use of MgO—$Al_2O_3$—$SiO_2$ glasses for optical fiber fabrication is that all of the MgO, $Al_2O_3$ and $SiO_2$ constituent oxides may be derived from vaporizable source materials such as $SiCl_4$ and the volatile β-diketonates of aluminum and magnesium, as disclosed, for example, in published European patent application No. EP 0103448.

Another advantage of the use of these glasses is the fact that selected refractive index and thermal expansion values can be realized in a system of relatively simple composition, so that the composition may be maintained substantially free of alkali metal oxides, boron oxide and the like. Boron is not a desirable constituent for presently used optical fibers because of its relatively high absorption at 1300 nm and above. The alkali metal oxides are difficult to obtain alone from vaporizable metal sources and are prone to migration in glass at the elevated temperatures needed to work the preform into fiber. This latter characteristic can make it difficult to maintain targeted refractive index and/or thermal expansion values for some waveguide designs in the drawn fiber.

I claim:

1. In an optical waveguide fiber having a glass core, a glass cladding having a lower refractive index than the core, and, optionally, at least one glass stress element integrally fused to the glass cladding, the improvement characterized in that at least one of the core and cladding is formed of a MgO—$Al_2O_3$—$SiO_2$ glass with a composition consisting essentially, in mole percent, of about 3-20% MgO, 3-42% $Al_2O_3$ and 45-94% $SiO_2$, an average linear coefficient of thermal expansion (0°-300° C.) in the range of $6-50 \times 10^{-7}/°C$., and a refractive index ($n_D$) in the range of 1.46-1.58.

2. An optical fiber in accordance with claim 1 which comprises a core and a cladding, wherein the core is formed of said MgO—$Al_2O_3$—$SiO_2$ glass, the cladding is formed of fused silica, and the optical fiber has a numerical aperture of at least about 0.3.

3. An optical fiber in accordance with claim 1 wherein the core is formed of said MgO—$Al_2O_3$—$SiO_2$ glass, and wherein the fiber is a single-mode optical fiber.

4. An optical fiber in accordance with claim 1 which comprises a core and a cladding, wherein the core is formed of said MgO—$Al_2O_3$—$SiO_2$ glass, the cladding is formed of MgO—$SiO_2$ glass, and the optical fiber has a numerical aperture of at least about 0.3.

5. An optical fiber in accordance with claim 4 wherein the cladding has an average linear coefficient of thermal expansion which does not differ from the average linear coefficient of thermal expansion of the core by more than $10 \times 10^{-7}/°C$.

6. An optical fiber in accordance with claim 1 which comprises a glass stress element composed of said MgO—$Al_2O_3$—$SiO_2$ glass, said stress element consisting of a compressively stressed outer cladding layer fused to the fiber cladding.

7. An optical fiber in accordance with claim 6 wherein each of the fiber cladding and the compressively stressed outer cladding layer is composed of said MgO—$Al_2O_3$—$SiO_2$ glass, the fiber cladding having a higher coefficient of thermal expansion than the outer cladding layer and a refractive index equal thereto.

8. An optical fiber in accordance with claim 1 which comprises a cladding composed of said MgO—$Al_2O_3$—$SiO_2$ glass, the cladding containing a pair of buried stress elements adjacent to but on opposite sides of the fiber core, said stress elements having a higher thermal expansion coefficient than said cladding and being in tensile stress.

9. An optical fiber in accordance with claim 8 wherein each of the cladding and buried stress elements is composed of said MgO—$Al_2O_3$—$SiO_2$ glass, and wherein the refractive index of said cladding is equal to the refractive index of the buried stress elements.

10. In an optical waveguide fiber having a glass core, a glass cladding having a lower refractive index than the core, and, optionally, at least one glass stress element integrally fused to the glass cladding, the improvement characterized in that
(i) the core and the cladding are formed of different $MgO-Al_2O_3-SiO_2$ glasses;
(ii) each of the core and cladding have a glass composition falling in the range consisting essentially, in mole percent, of about 3-20% MgO, 3-42% $Al_2O_3$, and 45-94% $SiO_2$, an average linear coefficient of thermal expansion (0°-300° C.) in the range of $6-50\times10^{-7}/°C.$, and a refractive index ($n_D$) in the range of 1.46-1.58;
(iii) the cladding has an average linear coefficient of thermal expansion which does not differ from the average linear coefficient of thermal expansion of the core by more than $10\times10^{-7}/°C.$; and
(iv) the optical fiber has a numerical aperture in excess of 0.35.

* * * * *